United States Patent Office 2,702,748
Patented Feb. 22, 1955

2,702,748

METHOD FOR MANUFACTURING CERAMIC PRODUCTS

Henry William Heine, Washington, D. C.

No Drawing. Application April 5, 1951,
Serial No. 219,510

5 Claims. (Cl. 106—41)

This invention relates to ceramics and is more particularly concerned with the manufacture of ceramic products such as bricks, tiles and so forth.

In the manufacture of ceramic products from clay, shale, diatomaceous earth, and the like, the conventional practice, after forming the plastic or embryo ceramic material into the desired pieces, is to first dry the pieces at a temperature of 200° to 220° F. and then water-smoke them at a temperature, such as in the range of 500° to 700° F., to drive off combined or latent moisture. This is followed by heating at a higher temperature to bake the material, usually in the range of about 1700° to 2100° F. for most commercial clay wares. Additional heating at higher temperatures may be used to finish treating the ware for special processing, such as fluxing, coloring and texturing (as in salt glazing). Depending upon the treatment, such additional heating may require temperatures as high as 4200° F. or higher.

The time required for drying, water-smoking and baking may extend from four to six days in commercial practice.

In accordance with the present invention complete drying, water-smoking and baking is effected in a single operation in a much shorter period than has heretofore been possible. Moreover, this result may be effected at a substantially constant temperature, thereby obviating the necessity for employing different successive temperatures and eliminating the need for more than a single kiln operating at a substantially constant temperature level.

Accordingly, the principal object of the present invention is the provision of a method for manufacturing ceramic products in a relatively short period as compared to conventional processes.

Another object is to manufacture ceramic products from materials such as clays, shales, diatomaceous earth, and the like, by the use of a single heating step.

A further object is to effect both drying, water-smoking, and baking of the ceramic material in a single heating step.

A still further object is to effect drying, water-smoking, baking and fluxing of the ceramic material in a single heating step.

Other objects of the invention include the manufacture of ceramic products by the use of less kiln space, less handling, easier control and in such a way that cooling of the final product after it leaves the kiln can be effected much quicker than by conventional methods without craze cracking.

In accordance with the method of this invention, the ceramic material such as clay, shale, diatomaceous earth or the like, from which the ceramic product is to be made is thoroughly and uniformly mixed with a moisture-absorbent material in finely divided form. In accordance with one embodiment of the invention the absorbent material is combustible and carbonaceous in character, such as, saw dust or wood chips, pulverized coal, coke or carbon, peat, bagasse, cotton or other cellulose fibers, corn cob granules, bamboo, buckwheat hulls, coconut shells and other agricultural products. Where a combustible material is used, the total B. t. u. thereof should be insufficient to cause sintering under the heat treatment to be effected. The combusible material should be added in an amount and in particle sizes sufficient to create a sufficient degree of space channelization throughout the mixture so that gases, including steam, can escape through the space channels without creating internal stresses of a magnitude sufficient to cause relative dimensional changes of the material being treated. Satisfactory results can be obtained by using particle sizes ranging from that of an impalpable powder to that passing through a ½ inch mesh screen, but those passing through a ⅛ inch screen are preferred for general use.

The quantity of material to be added will depend upon the fattiness and density of the ceramic material being used. For example, kaolin, shale and brick clays require less of the added material than commercial potter's clay. In general, however, about 5 to 15 per cent of the added material, by volume, is satisfactory, the higher percentages being used in the case of the fattier clays or shales. However, for special products, particularly where low specific gravity is desired, quantities as high as 50% may be employed. In other words, the amount of the added material is proportional to the fattiness and density of the ceramic material being used and inversely proportional to the specific gravity of the final product.

The ceramic material is thoroughly mixed with the combustible material, such as in a pug mill, and then formed into the desired pieces such as for brick, tile, or any other structural, ornamental or refractory ware. The pieces are then loaded into a kiln which may be of either the continuous or non-continuous type and the temperature of the kiln maintained at the baking or fluxing temperature of the ceramic material without any prior heating of the pieces at a lower temperature sufficient to cause complete evolution of steam. In other words, the temperature of the pieces is raised as quickly as possible to the ultimate stage temperature at which the product is to be finished. No preheating is necessary, except as may be required in bringing the temperature of the pieces to the ultimate stage temperature as a practical matter. For example, where fluxing of the material is not desired, the heating is initiated and maintained at temperature below the fluxing point. However, for any particular operations, it is to be understood that it is within the scope of this invention to first subject the material to a baking temperature and then to a fluxing temperature.

Different ceramic materials have different baking and fluxing temperatures, as indicated above. These baking and fluxing temperatures, however, are well known in the art and may be readily determined by reference to standard handbooks or by testing small samples of the material.

Under the constant heat treatment the ceramic material pieces go through several stages. At first, there is an evolution of gases, including steam, but the pieces do not undergo any substantial relative dimensional changes because of the space channelization. Also, due to the channelized nature of the material, the matrix is maintained moist by the evolving steam, thereby preventing relative dimensional changes of the matrix and cracking, including craze cracking.

During the evolution of the gases the surfaces of the pieces become coated with a film of black carbon. When the evolution of steam ceases, the carbon film burns and disappears completely. At the conclusion of the baking, which ordinarily takes about 20 to 30 minutes after the ultimate stage temperature is reached, the material is removed from the kiln and permitted to cool. Rapid cooling can be effected without danger of substantial cracking due to the channelized nature of the material.

The process is not limited to any particular type of kiln and may be carried out in any of the various coal, gas and oil fired kilns, as well as electric heated kilns.

Instead of using a combustible material, particles of inert or non-combustible prebaked porous, moisture absorbent, ceramic materials, such as grog, may be used in accordance with an alternative embodiment of the invention. Such material effects a similar type of channelization and similar results are obtained, except that a surface carbon film does not appear during the initial steam and gas evolution period.

I claim:

1. The method of rapidly manufacturing a ceramic product, said method consisting essentially of forming a wet plastic mass consisting essentially of a ceramic material selected from the group consisting of diatomaceous earth, clay, shale and mixtures thereof, and 5 to 50%, by volume, of a combustible lignocellulosic material in finely divided form, shaping the mass to a desired form, and then directly subjecting the formed mass while in a wet condition to a zone heated to a temperature in the range of about 1700° to 4200° F., for about 20 to 30 minutes.

2. The method as defined by claim 1 in which the lignocellulosic material is sawdust.

3. The method as defined by claim 1 in which the ceramic material is a mixture of diatomaceous earth and clay.

4. The method as defined by claim 1 in which the ceramic material is a mixture of diatomaceous earth and shale.

5. The method of rapidly manufacturing a ceramic product, said method consisting essentially of forming a wet plastic mixture consisting essentially of diatomaceous earth and 5 to 50 percent, by volume, of a combustible lignocellulosic material in finely divided form, shaping the mass of the mixture to a desired form, and then directly subjecting the shaped mass while in a wet condition to a zone heated to a temperature in the range of about 1700° to 4200° F. for about 20 to 30 minutes.

References Cited in the file of this patent

UNITED STATES PATENTS 2,420,863     Charles _____ May 20, 1947